United States Patent [19]

Shieh

[11] Patent Number: 4,934,921

[45] Date of Patent: Jun. 19, 1990

[54] INVESTMENT CASTING WAX INJECTION MACHINE

[76] Inventor: Kou-Han Shieh, No. 17, Lee Ming St., Ta Fa Industrial Zone, Ta Liao Hsiang, Kaohsiung Hsien, Taiwan

[21] Appl. No.: 406,702

[22] Filed: Sep. 13, 1989

[51] Int. Cl.⁵ .............................................. B29C 45/12
[52] U.S. Cl. ..................................... 425/547; 425/588
[58] Field of Search ................. 425/543, 547, 572, 588

[56] References Cited

U.S. PATENT DOCUMENTS

| Re. 30,225 | 3/1980 | Simmons et al. | 425/572 |
| 4,867,938 | 9/1989 | Schad et al. | 264/297.2 |

Primary Examiner—Willard Hoag
Attorney, Agent, or Firm—Bernard R. Gans

[57] ABSTRACT

An investment casting wax injection machine includes a heater for heating wax. A cylinder with a piston is disposed in the container which is disposed beside the working table. A discharge pipe connects the heater and the container for supplying the melted wax from the heater to the container. A disc is fixed at a bottom end of the cylinder. A number of check valves are provided on the piston and the disc. A distributor with a nozzle is disposed on the cylinder, and a check valve is provided between the distributor and the cylinder. A number of cooling manifolds are distributed in the distributor for cooling the wax.

4 Claims, 7 Drawing Sheets

INVESTMENT CASTING WAX INJECTION MACHINE

FIELD OF THE INVENTION

The present invention relates to an injection machine, and more particularly to an investment casting wax injection machine.

BACKGROUND OF THE INVENTION

A conventional investment casting wax injection machine is shown in FIGS. 6 and 7. The investment casting wax which is in solid state is inserted into a heater H. The investment casting wax is heated to a temperature of 80 to 90 C. so that it melts. The melted wax is then fed into a number of cylindrical containers R which are kept in a warmer W. After 24 hours, the wax in the containers R is dropped to a temperature of 40 to 50 C. One container R at a time is then inserted into a cylinder Y which is disposed on a slidable table T. The slidable table T is slidable on a seat S by means of a handle L so that the cylinder Y can be pushed into working position. Normally, the first 20% of the wax that comes out of each container R and is injected into the molds (not shown) is full of air bubbles. Those products formed with this wax are thus defective. In addition, the wax that remains in the bottom of the container R which is not of sufficient quantity to fill another mold has no further use. Therefore, only about ⅔ of the initial volume of wax in the container R is used.

The space requirement to install the warmer W is very great and it takes at least 24 hours for the melted wax to cool down. In addition, only about ⅔ of the wax in one container R is useful, i.e. one container R out of every three containers R is not used and it takes considerable time to handle and change the containers R. Obviously, the manufacturing process when utilizing the conventional investment casting wax injection machine is time consuming and uneconomical.

The present invention has arisen to mitigate and/or obviate the afore-described disadvantages of the conventional investment casting wax injection machine.

SUMMARY OF THE INVENTION

The primary objective of the present invention is to provide an investment casting wax injection machine which continuously feeds melted wax from a heater to a mold, thus reducing the wax transportation time and increasing the productivity.

Another objective of the present invention is to provide an investment casting wax injection machine which is efficient and with which it is not necessary to wait 24 hours for the melted wax to cool down.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
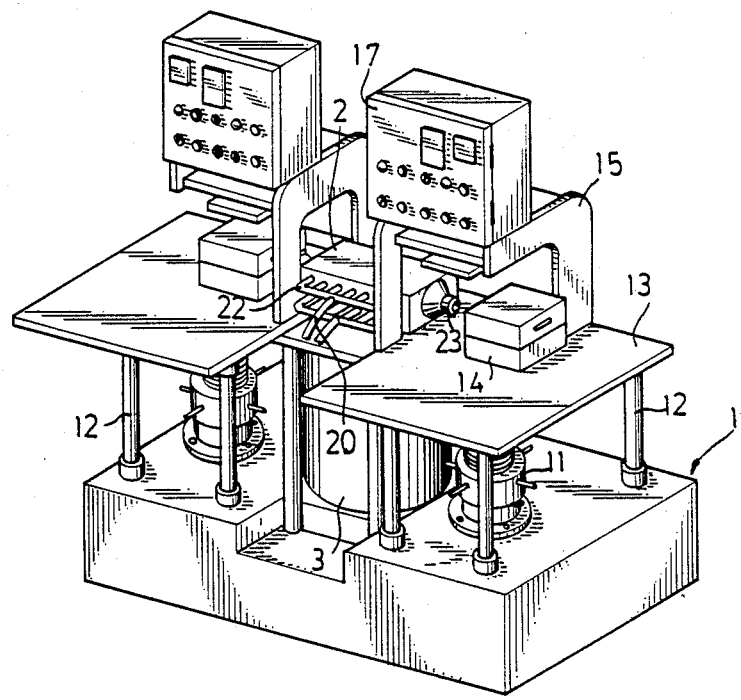
FIG. 1 is a perspective view of an investment casting wax injection machine in accordance with the present invention.

Referring to the drawings and initially to FIG. 1, the investment casting wax injection machine in accordance with the present invention comprises generally a seat 1 with a pair of working tables 13. The working tables 13 are disposed on both sides of the seat 1 and are slidable vertically by means of a pair of actuators 11. Each working table 13 is supported by four legs 12 on the corners thereof. A mold 14 is provided on each working table 13. The mold 14 can be moved freely on the working table 13. A pair of control boxes 17 are disposed on the working tables 13 by a respective bracket 15.

Figure 2:
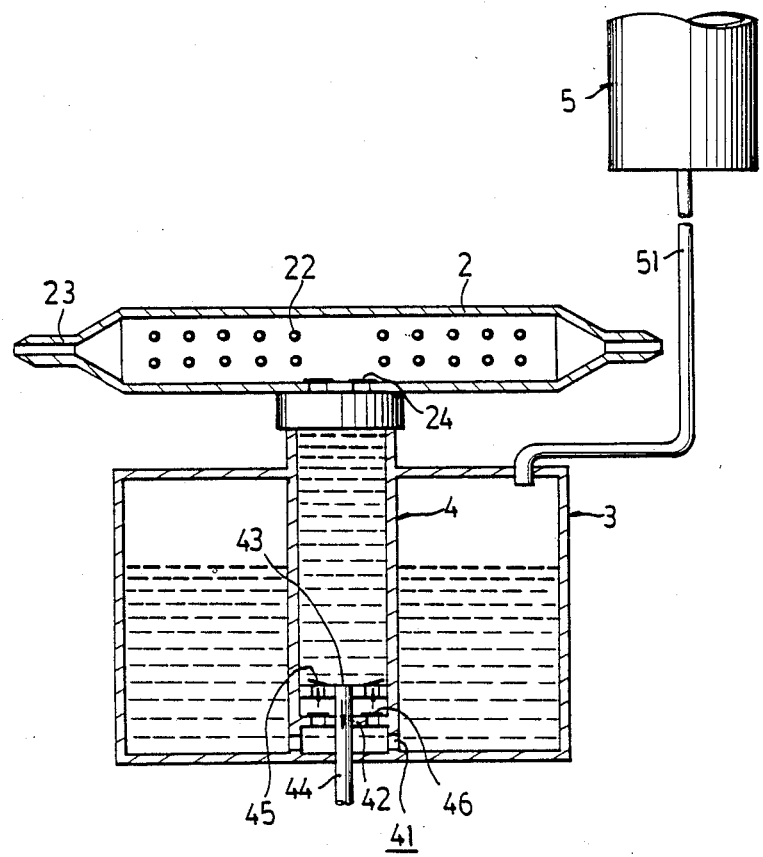
FIG. 2 is a partial cross sectional view of a container and a pair of nozzles, illustrating a flow passage for the investment casting wax.
Figure 3:
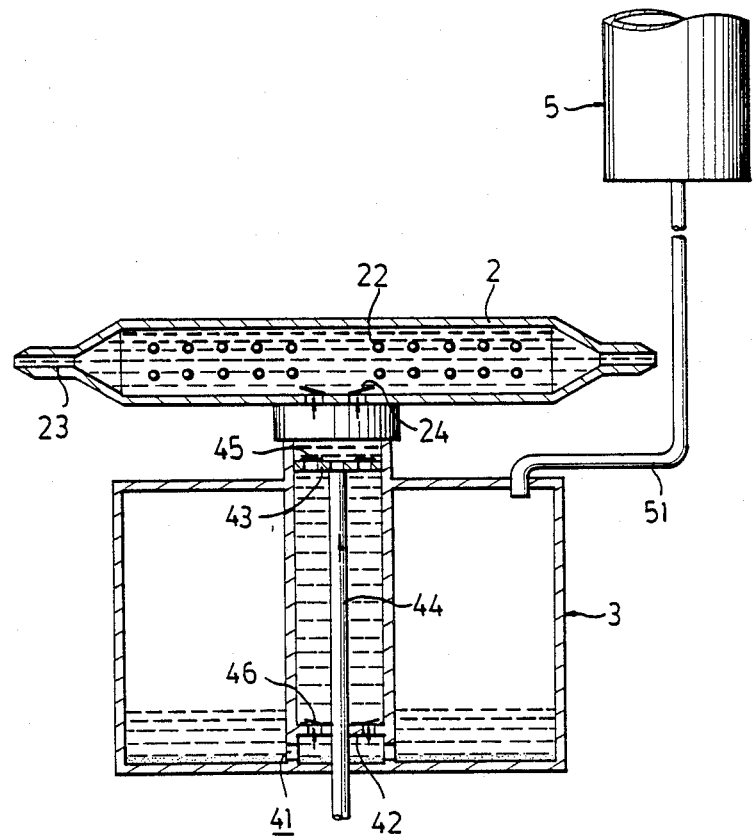
FIG. 3 is a partial cross sectional view similar to FIG. 2, illustrating a movement of the piston.

Referring next to FIGS. 2 and 3, the container 3 which is preferably made of heat insulating materials is disposed on the center of the seat 1. A cylinder 4 is vertically disposed in the container 3 with a piston 43 slidably provided therein. The piston 43 with a number of check valves or one way valves 45 is actuated by an actuator or the like (not shown) via the piston rod 44. A number of inlets 41 are formed at the base of the cylinder 4. A disc 42 with a number of check valves or one-way valves 46 is integrally disposed in the lower end of the cylinder 4 above the inlets 41. A distributor 2 with two outlets or nozzles 23 is disposed upon the cylinder 4. A number of check valves or one way valves 24 are provided between the distributor 2 and the cylinder 4. A number of water manifolds 22 which will be described with further details hereinbelow are provided and extend through the distributor 2. Investment casting wax is melted in a heater 5 and flows directly into the container 3 via a discharge pipe 51 by various means such as gravity. The heater 5 is generally a tank or the like with a heating apparatus (not shown) and is disposed above the container 3. The heater 5 can also be simply a tank for containing melted wax. The wax is preferably heated to a temperature from 80 to 90 C. The control box 17 controls the actuators 11, i.e. controls the vertical position of the working table 13, and the movement of the piston 43 in the cylinder 4.

When the piston 43 moves downward, the pressure between the piston 43 and the disc 42 is increased so that the check valves 46 are closed and the check valves 45 are opened which allows the wax to flow through the check valves 45 (FIG. 2). When the piston 43 moves up, the pressure between the distributor 2 and the piston 43 is increased so that the check valves 45 are closed and the check valves 24 are opened which allows the wax to flow through the check valves 24 into the distributor 2. Simultaneously, the check valves 46 are opened which allows the wax in the container 3 to flow into the space between the piston 43 and the disc 42 (FIG. 3). By repeating the operating cycle, the wax is forced to flow through the outlets 23 of the distributor 2 into the molds 14 (FIG. 1). Therefore, the wax can continuously flow from the heater 5 through the container 3 and the distributor 2 into the mold 14. The operation is thus very efficient. In addition, impurities and contaminant in the wax are dropped out and collected at the bottom of the container 3, which can then be cleaned easily.

Figure 4:
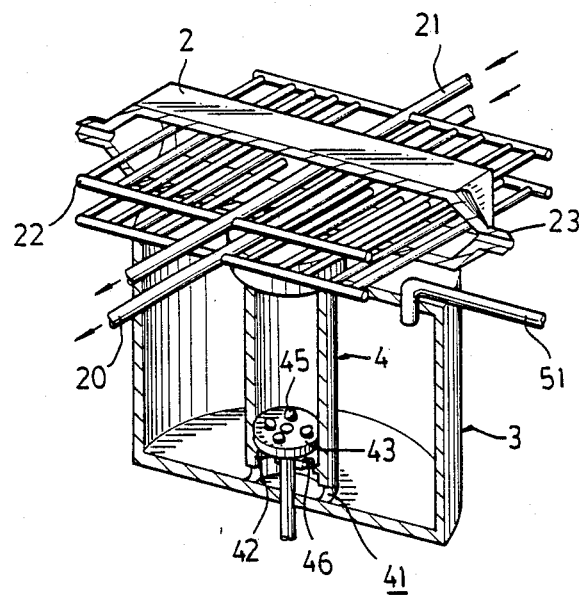
FIG. 4 is a partial perspective view of the heat exchanger.
Figure 5:
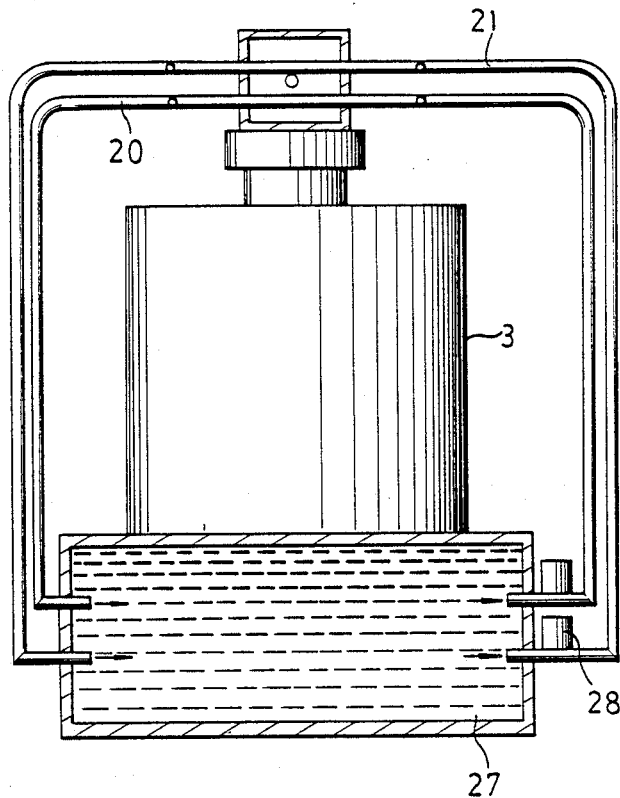
FIG. 5 is a cross sectional view of the cooling system.
Figure 6:
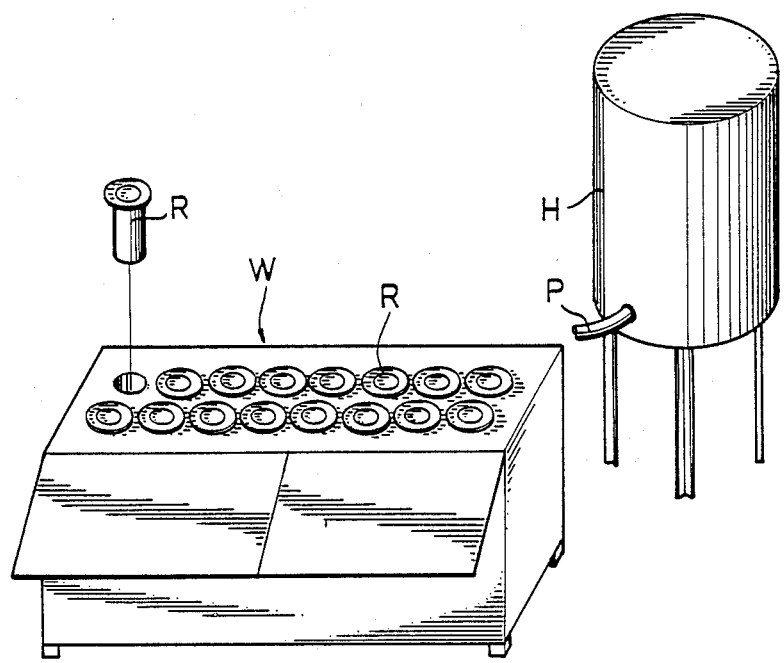
FIG. 6 is a perspective view of a conventional wax heater and a warmer.
Figure 7:
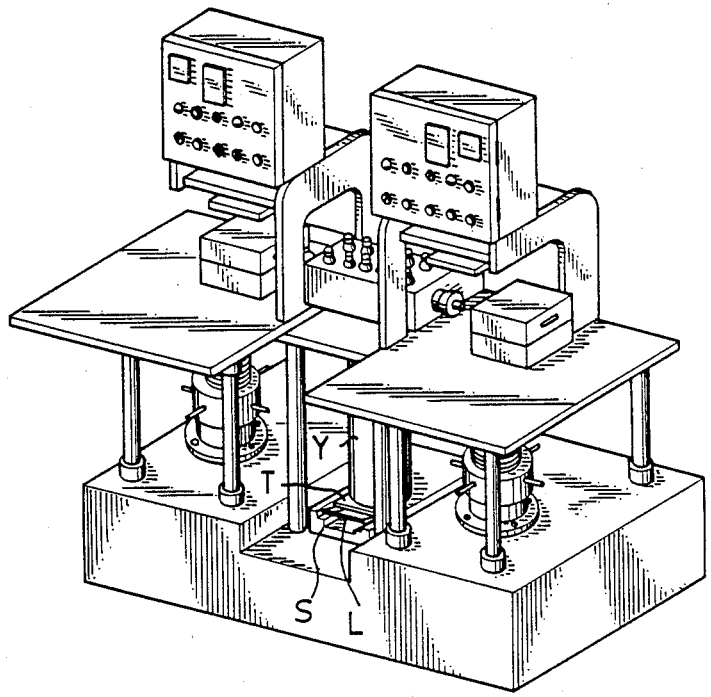
FIG. 7 is a perspective view of a conventional investment casting wax injection machine.

Referring next to FIGS. 4 and 5, the water manifold 22 has an inlet pipe 21 and an outlet pipe 20 which are connected to a heat exchanger or a reservoir 27. The motor 28 pumps cool water through the inlet pipe 21 into the manifolds 22 in order to cool the wax within the distributor 2. The manifolds 22 are spaced in the distributor 2 in order to increase the contact area between the manifolds 22 and the wax so that the cooling effect is increased. The wax flowing out of the nozzles 23 is preferably maintained at a temperature from 40 to 50 C.

The working tables 13 are arranged at predetermined locations on the seat 1 relative to the molds 14 so that the nozzles 23 of the distributor 2 can reach the molds 14. Obviously, one set comprising the working table 13, control box 17 and mold 14 will also perform the manufacturing process although two sets are shown in the drawings. The cooling water can be substituted for by other cooling agents.

Accordingly, the present invention has the following advantages:

(a) No additional space is required for the warmer as is required by a conventional investment casting wax injection machine.

(b) It is not necessary to wait 24 hours for the cooling of the investment casting wax.

(c) The manufacturing process with the investment casting wax injection machine of the present invention is continuous and fluent, which greatly reduces the working time thus greatly increasing the productivity.

(d) The impurities and the contaminants within the wax can be separated and removed easily, therefore maintaining a high quality of the products.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An investment casting wax injection machine comprising a tank for containing melted wax; a working table with a control box disposed thereon; a container with a cylinder disposed therein being provided beside said working table; a discharge pipe connecting said tank and said container; an inlet being formed at a base of said cylinder for communication of said cylinder and said container; a disc being fixed at a bottom end of said cylinder above said inlet and a piston being slidably provided in said cylinder above said disc; at least one check valve being provided respectively on said piston and said disc; a distributor with at least one nozzle being disposed upon said cylinder; and at least one check valve being provided between said distributor and said cylinder.

2. An investment casting wax injection machine according to claim 1, wherein a number of cooling manifolds are further provided and distributed in said distributor, and pass therethrough.

3. An investment casting wax injection machine according to claim 2, wherein an inlet pipe and an outlet pipe connects said manifolds to a reservoir; and a pump is further provided for pumping said cooling agent so that said cooling agent flows through said inlet pipe, said manifolds and said outlet and flows back to said reservoir.

4. An investment casting wax injection machine comprising a tank for containing melted wax; a working table with a control box disposed thereon; a container with a cylinder disposed therein being provided beside said working table; a discharge pipe connecting said tank and said container; an inlet being formed at a base of said cylinder for communication of said cylinder and said container; a disc being fixed at a bottom end of said cylinder above said inlet and a piston being slidably provided in said cylinder above said disc; at least one check valve being provided respectively on said piston and said disc; a distributor with at least one nozzle being disposed upon said cylinder; at least one check valve being provided between said distributor and said cylinder; and a number of cooling manifolds being distributed and passing through said distributor.

* * * * *